(12) United States Patent
Pothanikat et al.

(10) Patent No.: US 7,997,541 B2
(45) Date of Patent: Aug. 16, 2011

(54) SYSTEMS AND METHODS FOR SUPPORTING A PIPE

(75) Inventors: John J. Pothanikat, Missouri City, TX (US); Edward Earl Schauseil, II, Sugar Land, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 418 days.

(21) Appl. No.: 12/244,574

(22) Filed: Oct. 2, 2008

(65) Prior Publication Data

US 2009/0127407 A1 May 21, 2009

Related U.S. Application Data

(63) Continuation-in-part of application No. 11/506,327, filed on Aug. 18, 2006, now Pat. No. 7,467,766, and a continuation-in-part of application No. 12/175,880, filed on Jul. 18, 2008, now Pat. No. 7,950,609.

(51) Int. Cl.
*F16L 3/08* (2006.01)
*F16M 13/00* (2006.01)

(52) U.S. Cl. .......................... 248/74.1; 248/560

(58) Field of Classification Search ............... 248/74.1, 248/65, 55, 560, 632, 633; 138/103, 105
See application file for complete search history.

(56) References Cited

U.S. PATENT DOCUMENTS

| | | | |
|---|---|---|---|
| 3,543,804 A * | 12/1970 | Ziegler | 138/105 |
| 3,891,006 A * | 6/1975 | Lee | 138/106 |
| 4,530,478 A * | 7/1985 | McClellan | 248/62 |
| 4,539,005 A * | 9/1985 | Greenblatt | 604/141 |
| 4,787,583 A * | 11/1988 | Morton | 248/55 |
| 5,652,550 A * | 7/1997 | Vig | 331/68 |
| 6,068,882 A | 5/2000 | Ryu | |
| 6,382,259 B1 * | 5/2002 | Codling | 138/149 |
| 6,403,180 B1 | 6/2002 | Barrall | |
| 6,575,412 B2 * | 6/2003 | Klezath | 248/58 |
| 6,575,738 B1 * | 6/2003 | Nguyen et al. | 432/234 |
| 6,598,358 B1 | 7/2003 | Schwertfeger et al. | |
| 6,677,034 B1 * | 1/2004 | Hooley et al. | 428/323 |
| 6,989,123 B2 | 1/2006 | Lee et al. | |
| 7,078,359 B2 | 7/2006 | Stepanian et al. | |

(Continued)

FOREIGN PATENT DOCUMENTS

WO   WO 2006/002440   1/2006

OTHER PUBLICATIONS

Smith, Christopher E., Aerogels advance in pipeline, tank storage use, Oil & Gas Journal, Jul. 10, 2006, pp. 1-4, PennWell Publishing Company.

*Primary Examiner* — Anita M King
(74) *Attorney, Agent, or Firm* — KBR IP Legal

(57) ABSTRACT

Systems and methods for supporting a pipe are provided. An insulated pipe system can include a pipe, a first isolator disposed about at least a portion of the pipe, wherein the first isolator comprises aerogel, and a second isolator disposed about at least a portion of the first isolator; at least one clamp adapted to support the pipe and the isolators; at least one support base; and at least one support member, wherein the support member connects the clamp to the support base.

28 Claims, 11 Drawing Sheets

U.S. PATENT DOCUMENTS

| | | |
|---|---|---|
| 7,226,243 B2 | 6/2007 | Lee et al. |
| 7,238,311 B2 | 7/2007 | Ristic-Lehmann et al. |
| 7,399,439 B2 | 7/2008 | Lee et al. |
| 7,611,101 B2 * | 11/2009 | van Walraven ............ 248/74.4 |
| 2005/0046086 A1 | 3/2005 | Lee et al. |
| 2005/0155663 A1 | 7/2005 | Dhellemmes et al. |
| 2005/0167891 A1 | 8/2005 | Lee et al. |
| 2006/0125158 A1 | 6/2006 | Rouanet et al. |
| 2006/0196568 A1 | 9/2006 | Leeser et al. |
| 2006/0272727 A1 | 12/2006 | Dinon et al. |
| 2007/0004306 A1 | 1/2007 | Leeser et al. |
| 2007/0154698 A1 | 7/2007 | Stepanian |
| 2007/0163666 A1 | 7/2007 | Lee et al. |
| 2007/0173157 A1 | 7/2007 | Trifu et al. |
| 2007/0220904 A1 | 9/2007 | Jibb et al. |
| 2007/0264485 A1 | 11/2007 | Stepanian et al. |
| 2008/0014402 A1 | 1/2008 | Tomich |
| 2008/0087870 A1 | 4/2008 | Williams et al. |
| 2008/0093016 A1 | 4/2008 | Lee et al. |

* cited by examiner

SYSTEMS AND METHODS FOR SUPPORTING A PIPE

CROSS-REFERENCE TO RELATED APPLICATIONS

This application is a continuation-in-part (CIP) of co-pending U.S. patent application having Ser. No. 12/175,880, filed on Jul. 18, 2008, and a continuation-in-part (CIP) of co-pending U.S. patent application having Ser. No. 11/506,327, filed on Aug. 18, 2006, which are both incorporated by reference herein.

BACKGROUND

1. Field of the Invention

Embodiments described generally relate to systems and methods for supporting pipes. More particularly, embodiments described relate to systems and methods for supporting pipes for both low and high temperature applications.

2. Description of the Related Art

Pipe shoes are utilized in various industries to support piping. Vibrations, for example, from the processing or flow of fluids, can propagate through pipe, pipe shoes, and supporting structure and lead to significant noise emissions therefrom. Occupational noise exposure is frequently regulated, for example by United States' Occupational Safety & Health Administration (OSHA) standards. Noise abatement in cold insulated, ambient temperature and/or small diameter piping is frequently effected simply by insulating the pipe itself. Hot piping, on the other hand, especially in the 50 mm and greater diameters, presents unique problems for noise control because methods and/or materials suitable for isolating cold piping can be inadequate if exposed to the high temperatures and/or compressive forces in a hot pipe where it is supported on a pipe shoe or other support device.

Pipe shoes commonly include a base and a pair of axially spaced clamps for interconnecting a generally lower semi-circular clamp fixed to the base to a generally upper semi-circular clamp, so that the connected clamps support the piping. The base may slide along the planar upper surface of the pipe rack as the process pipe expands or contracts in length. The generally lower clamp half is welded to the base, so that the weight of the pipe is supported on the generally lower clamp half. Ears project radially outward from both the lower and upper clamp halves, and a pair of conventional bolts interconnects the mating radially-opposing ears to secure the piping to the pipe shoe.

BRIEF DESCRIPTION OF THE DRAWINGS

So that the recited features provided herein can be understood in detail, a more particular description of the features may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
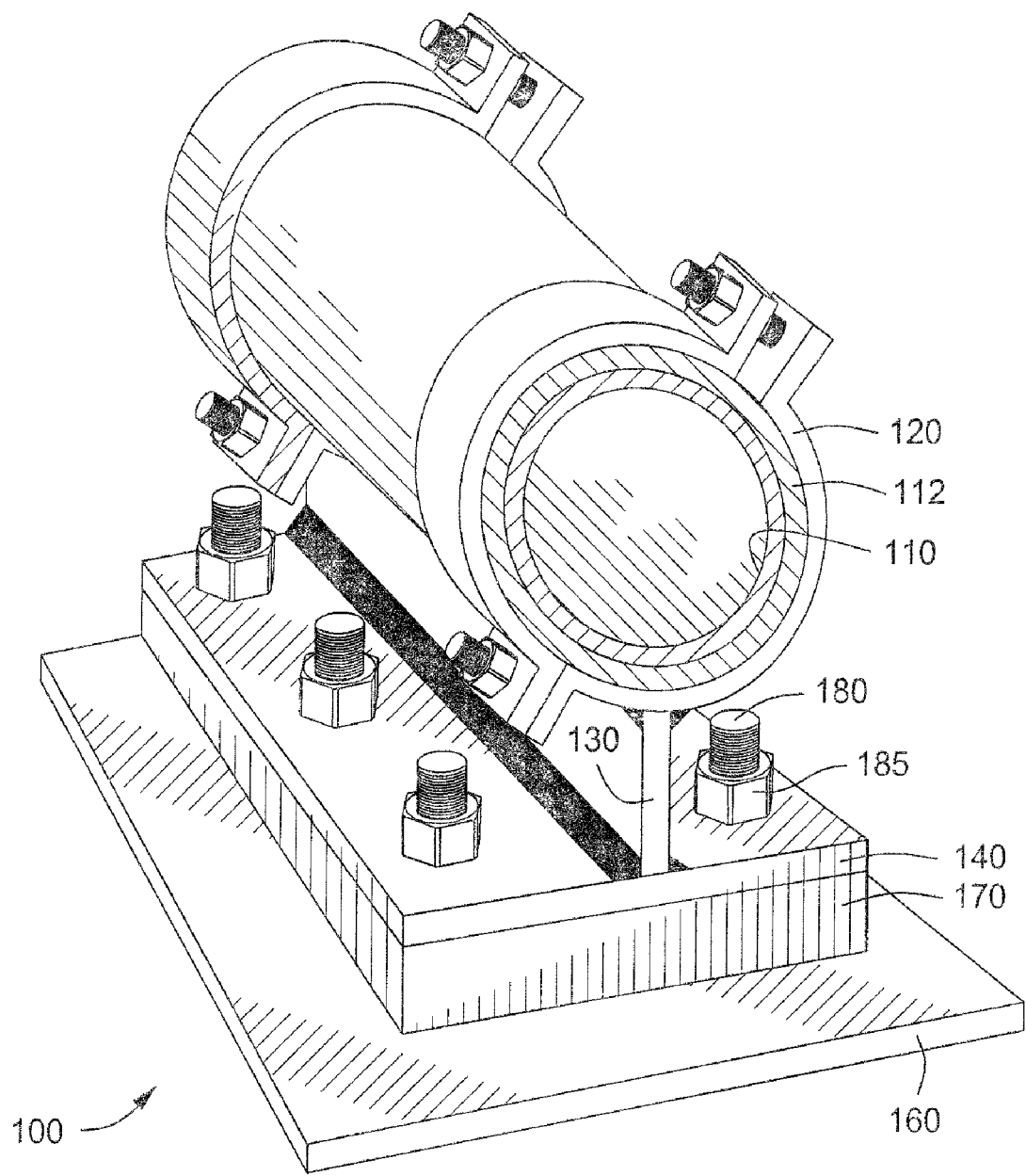
FIG. 1 depicts an overhead orthogonal illustration of an illustrative pipe support system for dampening acoustic propagation from a pipe, according to one or more embodiments described.

FIG. 1 depicts an overhead orthogonal illustration of an illustrative pipe support system 100 for dampening acoustic propagation from a pipe 110, according to one or more embodiments. One or more acoustic isolators 150 can be disposed between a movable base 140 and a support base 160. The one or more acoustic isolators 150 can minimize the propagation of pipe vibration to the underlying support structure. Such vibration can be caused by fluid flow, thermal effects, and/or auxiliary equipment to which the pipeline is attached. The one or more acoustic isolators 150 can be fabricated using one or more heat resistant materials, such as fiber reinforced calcium silicate.

The pipe support system 100 can include one or more pipes 110, pipe clamps 120, support bars 130, insulation 190 and protective covering 195 can be supported by the movable base 140. The pipe 110 can include two or more joints of pipe to form a pipeline. The support base 160 can be permanently attached to or integral with an underlying support structure. One or more flexible peripheral seals 170 can be disposed about the outer perimeter of the one or more acoustic isolators 150, between the movable base 140 and the support base 160.

Figure 2:
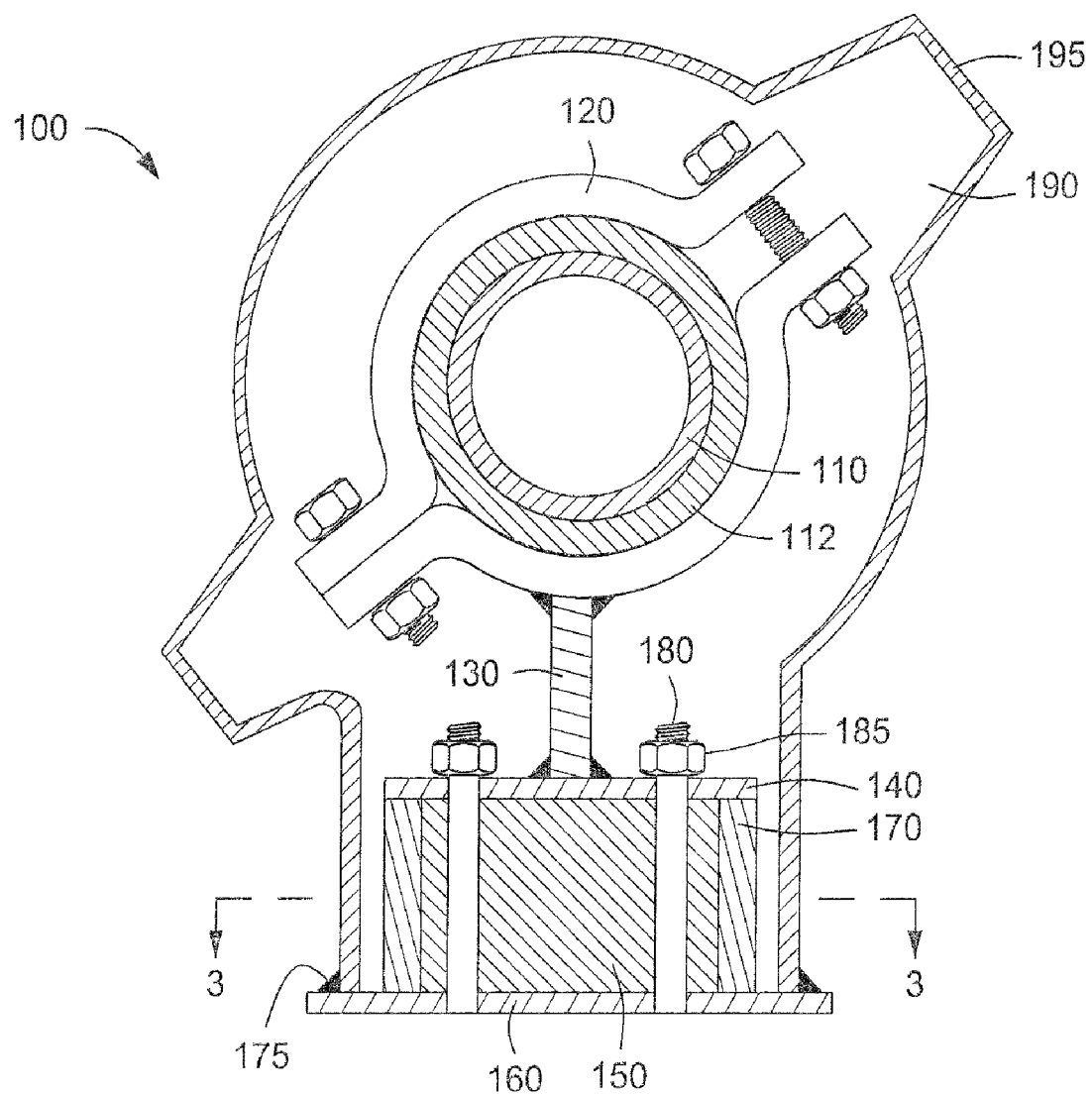
FIG. 2 depicts a vertical cross-sectional illustration of the pipe support system depicted in FIG. 1, according to one or more embodiments described.
Figure 3:
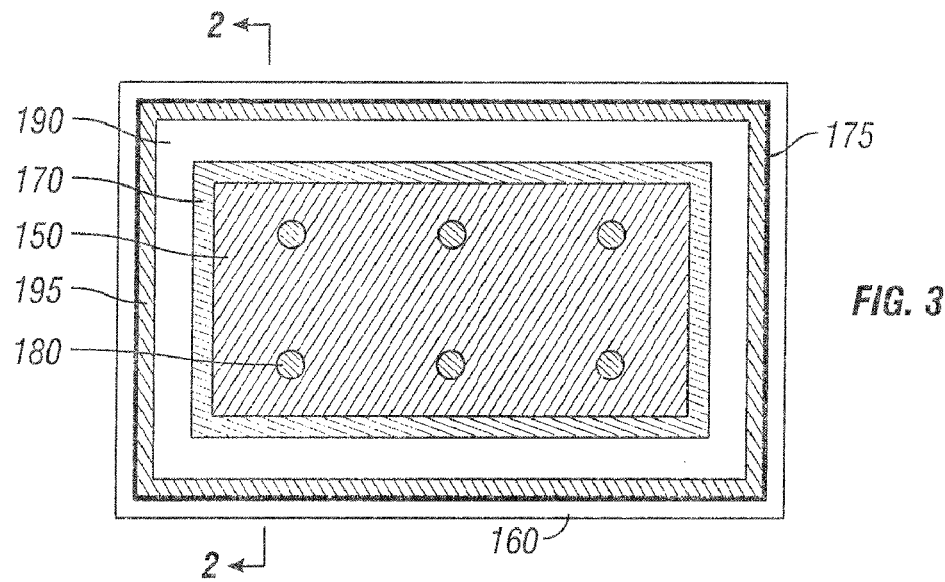
FIG. 3 depicts a horizontal cross-sectional illustration of the support base, flexible peripheral seal, and acoustic isolator of the pipe support system depicted in FIG. 2, along the line 3-3, according to one or more embodiments described.

The pipe support system 100 can include one or more clamps 120, for example a single split-clamp as depicted in FIGS. 1, 2 and 3. The one or more pipe clamps 120 can be a double bolt clamp as shown, and further can be any type of clamp known in the art, such as, for example, a single bolt clamp, a clamp with sections joined by weldment, a band type clamp, etc. The pipe support system 100 in FIGS. 1, 2 and 3 is depicted using a split-clamp 120; however any type of pipe clamping or supporting member known to one of ordinary skill in the art can be included. For example, the one or more support bars 130 can be welded directly to the pipe 110 to form an integral pipe support member if desired. In one or more specific embodiments, the one or more pipe clamps 120 can be secured directly to the pipe 110 to improve structural reliability of the pipe support system 100.

Optionally, one or more isolation materials or barriers 12 can be disposed between the pipe 110 and the clamp 120 to thermally and/or acoustically isolate the pipe 110 from the clamp 120. The barrier 112 can be continuously disposed about an outer diameter of the pipe 110. The barrier 112 can also be disposed about the pipe as one or more axially and/or radially disposed bands or strips.

The barrier 112 can be made of any material suitable for thermal and/or acoustic isolation. For example, the barrier 112 can be made of silica aerogels, woven fibers, non-woven fibers, or combinations thereof. In at least one specific embodiment, the barrier 112 can be made of a silica aerogel that is reinforced with a non-woven, glass-fiber matting, such as Pyrogel XT™ that is available from Aspen Aerogel.

The one or more pipe clamps 120 can be attached to the movable base 140 using one or more support bars 130. In one or more embodiments, the support bar 130 can be a continuous length as shown. A first end of the one or more support bars 130 can be connected via welding, or bolting at a first end to movable base 140. A second end of the one or more support bars can be attached to the pipe clamp by any means known in the art, including, but not limited to, a welding, bolting, or any other equivalent fastening system. In operation, any vibration of pipe 110 can be transmitted via the one or more pipe clamps 120 and support bars 130 to the movable base 140.

FIG. 2 depicts a vertical cross-sectional illustration of the pipe support system 100 depicted in FIG. 1, according to one or more embodiments. FIG. 3 depicts a cross-sectional illustration of the support base 160, flexible peripheral seal 170, and acoustic isolator 150 of the pipe support system 100 depicted in FIG. 2, along the line 3-3 according to one or more embodiments.

With reference to FIGS. 1, 2, and 3, the one or more acoustic isolators 150 can be subjected to a high compressive load imposed by the combined weight of the pipe 110, pipe support 130, pipe clamp 120, insulation 190, protective covering 195, and the weight of the fluid within the pipe 110. The use of a rigid material having a high compressive strength for the one or more acoustic isolators 150 can thus be particularly advantageous. In one or more embodiments, the acoustic isolator 150 can be suitable for use in ambient and/or elevated temperatures. In one or more embodiments, the one or more acoustic isolators 150 can be flame resistant and/or incombustible. The one or more acoustic isolators 150 can include one or more independent first acoustic isolators 150 disposed in one or more locations between the support base 160 and the sub-support base 140. In one or more embodiments, the acoustic isolator 150 can include one or more layers or plies of similar or dissimilar materials. One example of an acoustic isolator 150 suitable for exposure to high compressive loads can be a fiber-reinforced calcium silicate, such as that commercially available under the trade designations MARTINTE, MARINITE P, MARINITE L, etc.

One or more fasteners 180 can be used to connect the movable base 140 to the support base 160. The one or more fasteners 180 can include, but are not limited to, any combination of nut, bolt, stud, weldment, washer, rivet, screw, wire, or the like. In the embodiment depicted in FIGS. 1, 2, and 3, a weldment can be formed between the one or more fasteners 180 and support base 160. The one or more fasteners 180 can extend through a complimentary, bore in the one or more acoustic isolators 150, as seen best in FIG. 2, and can extend through an aperture in the movable base 140. One or more nuts 185 can be threadedly attached to the proximal end of the one or more fasteners 180 to detachably attach or connect the movable base 140, the one or more acoustic isolators ("first flexible member") 150, and support base 160 together. Any number of fasteners 180 can be used, and the quantity can be more or less than the six fasteners depicted in FIGS. 1, 2, and 3.

One or more flexible peripheral seals 170 can be disposed around the one or more acoustic isolators 150. The peripheral seal 170 can cooperate with the one or more acoustic isolators 150 to aid the reduction of acoustic propagation, and can also beneficially minimize or eliminate the ingress and/or egress of fluid or contaminants to the one or more acoustic isolators 150. The peripheral seal 170 thus allows for the use of materials for the one or more acoustic isolators 150 having superior acoustic dampening characteristics, but might otherwise experience deterioration of acoustic and/or structural properties if exposed to the ambient environment, weather, and/or process fluids.

The flexible peripheral seal 170 can be provided using one or more flexible sealants having adhesive properties to form a seal against the opposing movable base 140 and support base 160. A non-limiting example of a flexible sealant for use with hot pipe 110 is an epoxy polysulfide caulk such as that commercially available under the trade designation UNICOAT 5800 (rated for temperature exposure up to 190° C. (375° F.)). Additionally, a flexible sealant can be disposed between a fastener (e.g., nut 185 and stud 180) and movable base 140 to further prevent exposure of the acoustic isolator 150. The periphery of the acoustic isolator 150 can be recessed with respect to the movable base 140 and support base 160 by the thickness of the seal 170 so that an outer surface of the seal 170 is coterminous with the edges of the top and support bases. Alternatively, the periphery of the movable base 140 and the acoustic isolator 150 can be coterminous, or offset inwardly or outwardly. As used herein, the term "hot" refers to a surface temperature of at least 90° C., such as at least 92° C., 95° C., 97° C., 100° C., 110° C., 125° C., 150° C., 200° C., 250° C., or at least 300° C.

In one or more embodiments, thermal insulation 190 can be disposed about and proximate to the one or more pipes 110. Thermal insulation 190 can include, but is not limited to, sprayed or preformed urethane foam insulation or mineral wool. As shown in the embodiment depicted in FIGS. 1, 2, and 3, the thermal insulation 190 can extend to the upper surface of the support base 160. Optionally, the thermal insulation 190 can substantially cover any portion of any otherwise thermally exposed surfaces of the pipe 110, clamp 120, support bar 130, movable base 140, acoustic isolator 150, flexible peripheral seal 170, support base 160, or any combination thereof. A protective covering 195 can be included over the thermal insulation 190. Protective covering 195 can be a thin metal sheet, for example, stainless steel or aluminum, fabric, or a coating of mastic. The thermal insulation 190 and/or protective covering 195 can be bolted, glued, and/or band strapped to the pipe 110 and/or pipe support system 100 if desired.

In one or more embodiments, the protective covering 195 can extend to the support base 160 and include an optional weather seal 175 to seal the protective covering 195 to the upper surface of the support base 160. The weather seal 175 can be an epoxy polysulfide caulk, if desired. Thermal insulation 190 and/or protective covering 195 can extend axially along the pipe 110, for example, to a second shoe of a pipe support system.

Figure 4:
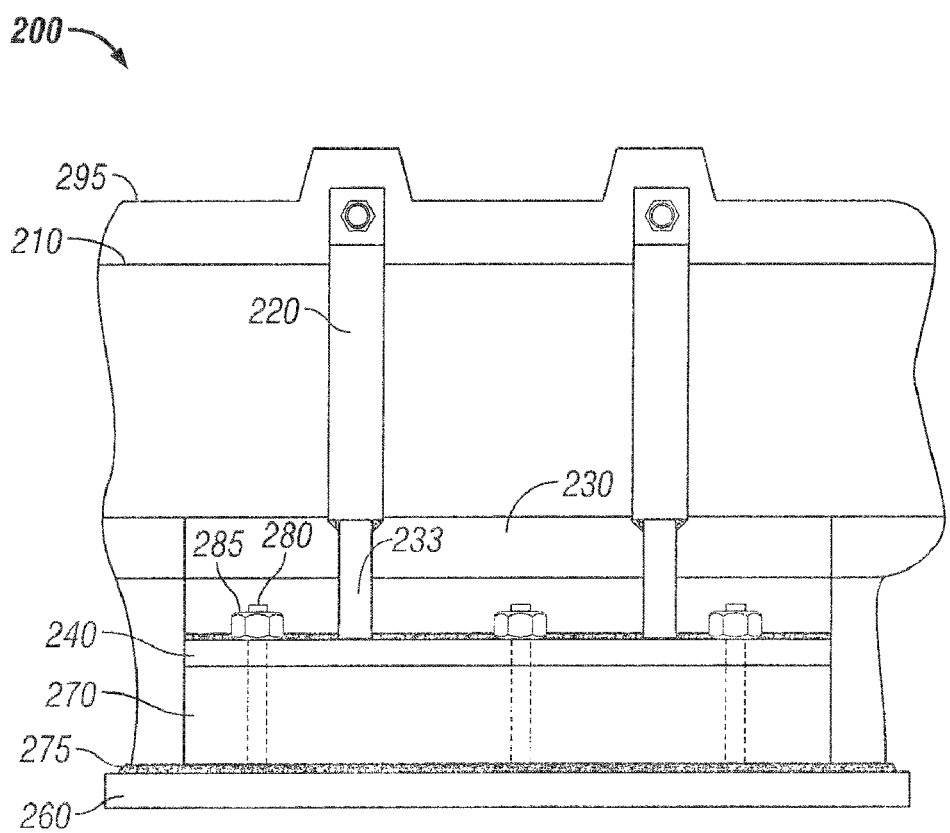
FIG. 4 depicts a side-perspective schematic illustration of a pipe support system for dampening acoustic propagation from an insulated pipe, according to one or more embodiments described.
Figure 5:
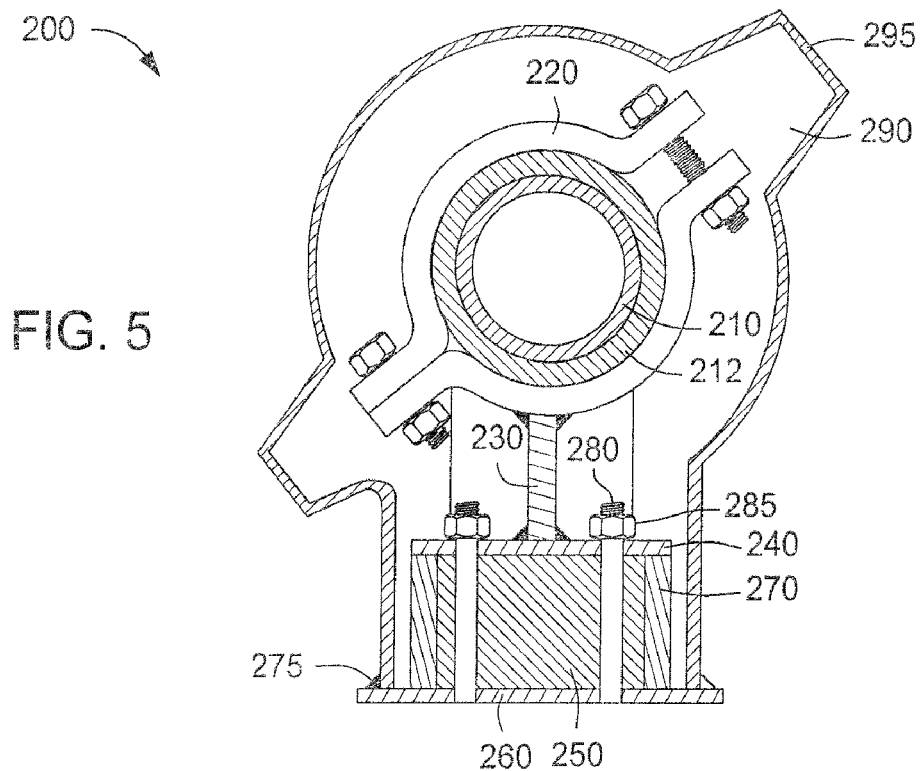
FIG. 5 depicts a cross-sectional illustration of a pipe support system depicted in FIG. 4, according to one or more embodiments described.
Figure 6:
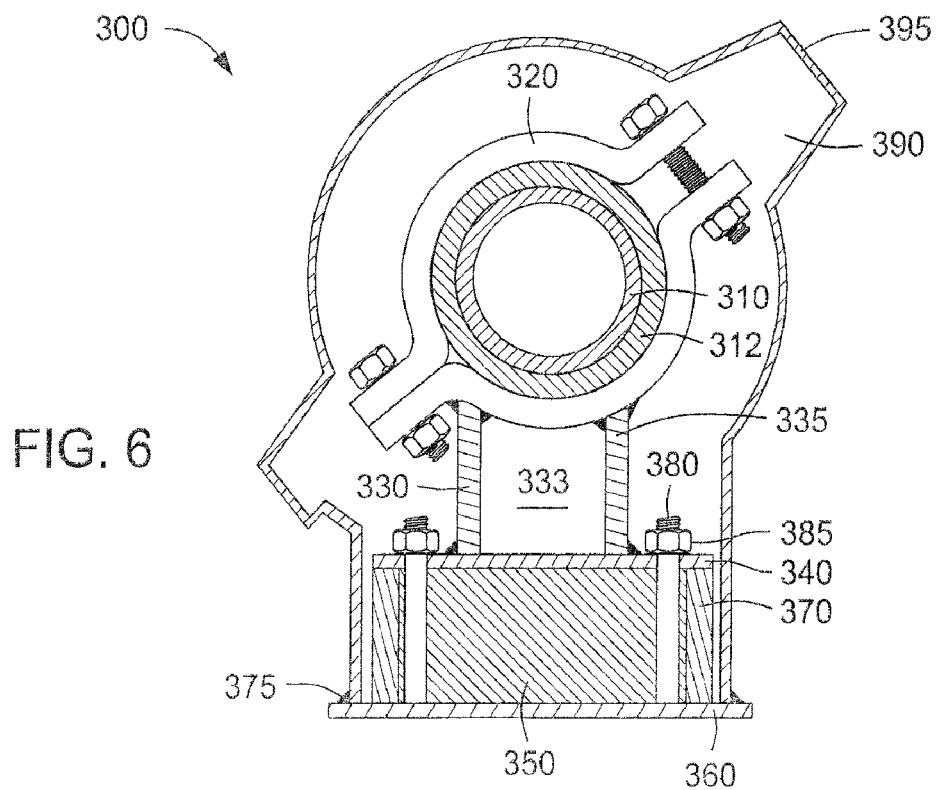
FIG. 6 depicts a cross-sectional illustration of another pipe support system, according to one or more embodiments described.
Figure 7:
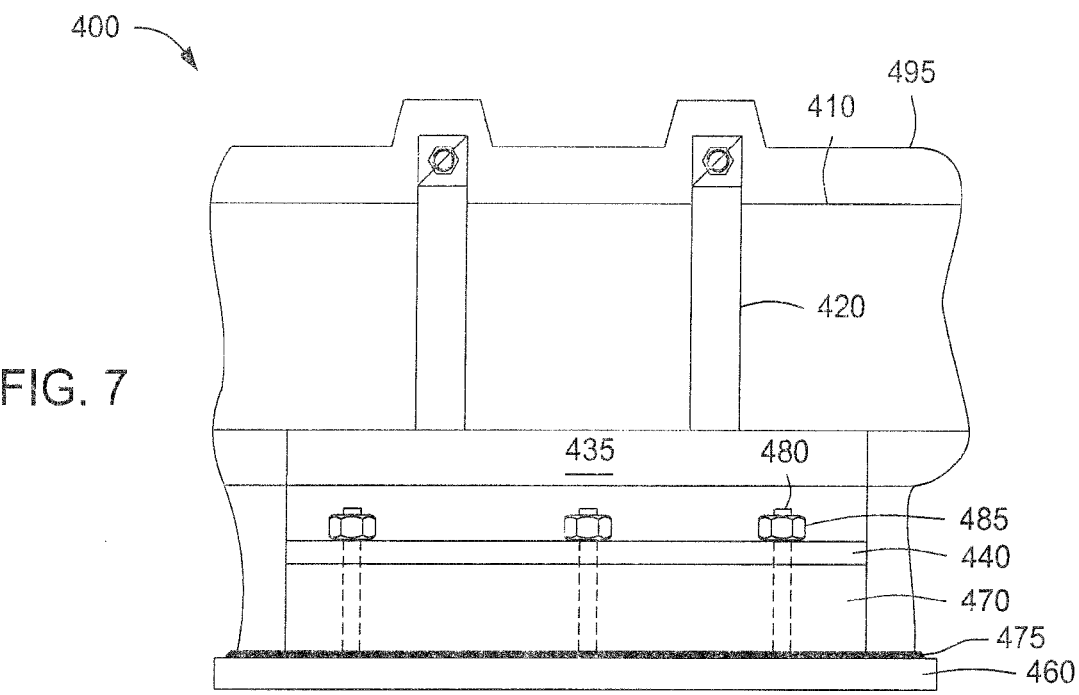
FIG. 7 depicts a side elevation of a pipe support system for dampening acoustic propagation from an insulated pipe, according to one or more embodiments described
Figure 8:
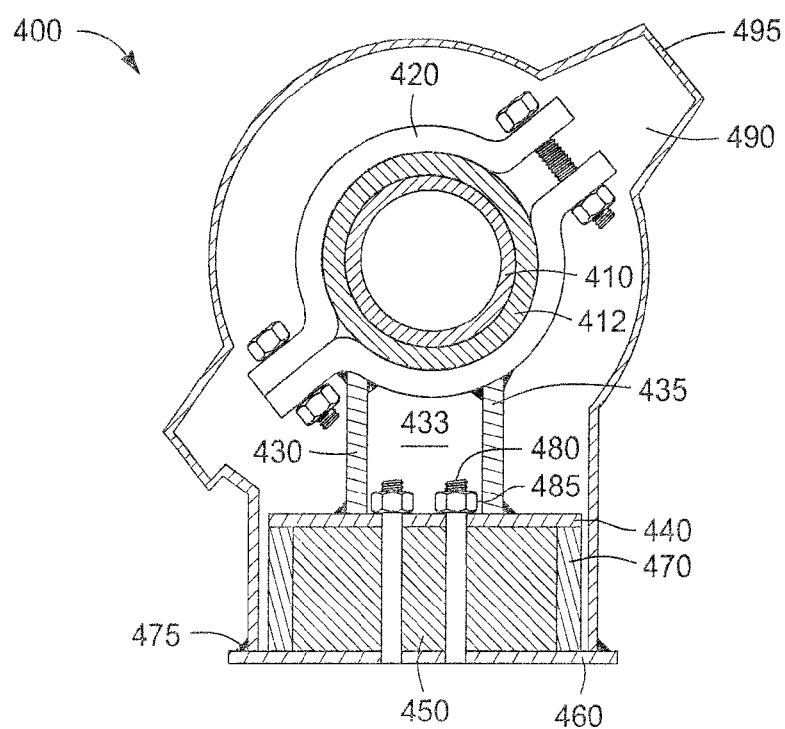
FIG. 8 depicts a cross-sectional illustration of the pipe support system depicted in FIG. 7, according to one or more embodiments described.

FIG. 4 depicts a side-perspective schematic illustration of a pipe support system 200 for dampening acoustic propagation from a pipe, according to one embodiments. FIG. 5 depicts a cross-sectional schematic illustration of the pipe support system 200 as depicted in FIG. 4. FIG. 6 depicts a cross-sectional schematic illustration of a pipe support system 300, according to one or more embodiments. FIG. 7 depicts a side-perspective schematic illustration of a pipe support system 400 for dampening acoustic propagation from an ambient or elevated temperature, insulated, pipe, according to one or more embodiments. FIG. 8 depicts a cross-sectional schematic illustration of the pipe support system 400 depicted in FIG. 7.

The embodiments depicted in FIGS. 4, 5, 6, 7, and 8 include one or more acoustic isolators (250, 350, 450) disposed between a movable base (240, 340, 440) and a support base (260, 360, 460). The movable base (240, 340, 440) can be attached to support base (260, 360, 460) using a plurality of fasteners (280, 380, 480) and nuts (285, 385, 485). A flexible peripheral seal (270, 370, 470) can be disposed between the movable (240, 340, 440) and support bases (260, 360, 460) about the perimeter of the one or more acoustic isolators (250, 350, 450).

In one or more embodiments, the pipe support system (200, 300, 400) can include thermal insulation (290, 390, 490) and/or protective covering (295, 395, 495) over all or a portion of the pipe support system (200, 300, 400) and/or pipe (210, 310, 410). In one or more embodiments, the thermal insulation (290, 390, 490) and/or protective covering (295, 395, 495) can include a weather seal (275, 375, 475) disposed along the joints formed where the protective covering (295, 395, 495) abuts the weather seal (275, 375, 475).

As mentioned above, one or more isolation materials or barriers 212, 312, 412 can be optionally disposed between the pipe 210, 310, 410 and the clamps 220, 320, 420 to thermally and/or acoustically isolate the pipe. The barrier 212, 312, 412 can be continuously disposed about an outer diameter of the pipe 110, 210, 310, 410 or disposed as one or more axially and/or radially disposed bands or strips.

The barrier 212, 312, 412 can be made of any material suitable for thermal and/or acoustic isolation. For example, the barrier can be made of silica aerogels, woven fibers, non-woven fibers, or combinations thereof. In at least one specific embodiment, the barrier can be made of a silica aerogel that is reinforced with a non-woven, glass-fiber matting, such as Pyrogel XT™ that is available from Aspen Aerogel.

In the exemplary embodiment depicted in FIGS. 4 and 5, a pipe support system 200 can include one or more pipe clamps 220 connected to movable base 240 using a support bar 230. The clamp 220 can be further supported by a gusset 233 disposed transverse to the support bar 230. The term "gusset" as used herein, should not be limited to a triangular shape, and instead can include any shape useful for improving the rigidity between two or more perpendicularly connected members, such shapes can, in various examples, be polygonal, circular or ellipsoidal.

In the embodiment depicted in FIG. 6, a pipe support system 300 can include one or more pipe clamps 320 connected to the movable base 340 using one or more support bars (two are shown, 330, 335). Optionally, the one or more pipe clamps 320 can be supported using a gusset 333 disposed transverse to the one or more support bars (330, 335).

In the embodiment depicted in FIGS. 7 and 8, a pipe support system 400 can include one or more pipe clamps 420 connected to the movable base 440 by dual support bars (430, 435). Optionally, clamp 420 can be further supported by a gusset 433 disposed transverse to the support bars (430, 435). In this embodiment, the studs 480 and nuts 485 are disposed between support bars (430, 435); however a fastener retaining the movable base 440 to a support base 460 can be disposed at any location thereof. The number of clamps and/or support bars per pipe shoe is not limited to the embodiments shown.

In yet another embodiment, an apparatus for dampening acoustic propagation from a pipeline is provided. A pipe support can include a support base and a movable base spatially arranged from the support base. One or more fasteners can be disposed through the movable base to the support base, thereby connecting the movable base to the support base. One or more acoustic isolators can be disposed between an upper surface of the support base and a lower surface of the movable base.

In one or more embodiments, the one or more acoustic isolators can include, but is not limited to a monolithic member fabricated from fiber reinforced calcium silicate. In one or more embodiments, the one or more acoustic isolators can include two or more members fabricated using one or more heat resistant materials and one or more vibration dampening materials. In one or more embodiments, the one or more heat resistant materials can be disposed about the one or more fasteners.

Figure 9:
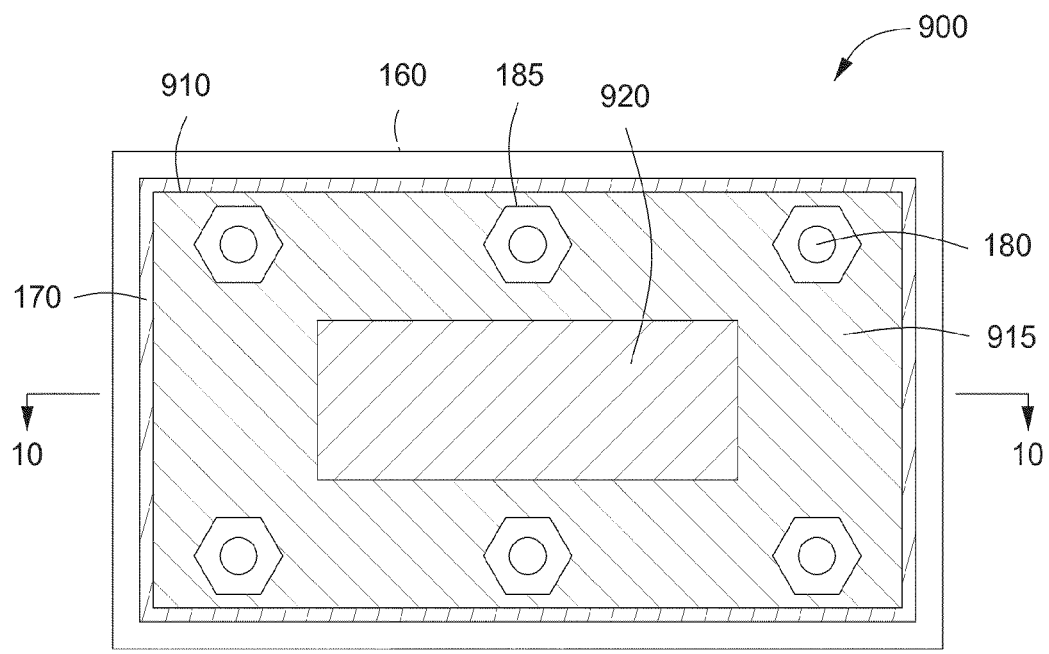
FIG. 9 depicts another horizontal cross-sectional illustration of a pipe support system according to one or more embodiments described.
Figure 10:
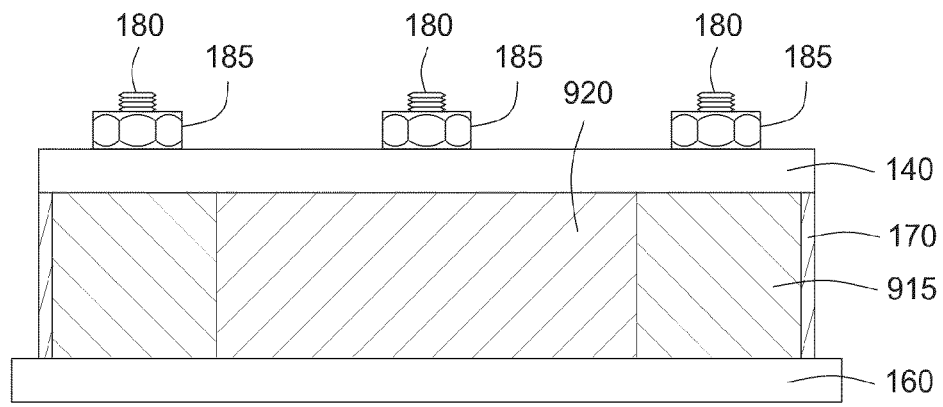
FIG. 10 depicts a vertical cross-sectional illustration of the pipe support system depicted in FIG. 9 along line 10-10, according to one or more embodiments described.

FIG. 9 depicts another horizontal cross-sectional illustration of a pipe support system 900 according to one or more embodiments. FIG. 10 depicts a vertical cross-sectional illustration of the pipe support system 900 along line 10-10, according to one or more embodiments. A composite of at least two different materials can be used to form the acoustic isolator 910 disposed between the movable base 140 and the support base 160. The composite construction of the acoustic isolator advantageously combines one or more heat resistant isolators 915 with one or more vibration absorbing materials 920 to provide a single pipe support system 900 capable of both thermally and mechanically isolating one or more pipes from an underlying support structure.

In one or more embodiments, the heat resistant isolator 915 can be formed in a hollow shape, having one or more openings disposed therethrough. In one or more embodiments, at least one of the one or more fasteners 180 connecting the movable base 140 to the support base 160 can penetrate through one or more bores through the heat resistant isolator 915. The one or more heat resistant isolators 915 can be fabricated using one or more materials suitable for high compressive loads, for example fiber-reinforced calcium silicate. Fiber-reinforced calcium silicate is commercially available under the trade designations MARINITE, MARINITE P, MARINITIE L, etc. In one or more embodiments, one or more flexible peripheral seals 170 can be disposed around the one or more acoustic isolators 910.

The acoustic isolator 910, as depicted in FIGS. 9 and 10 can include a heat resistant isolator 915 in the shape of a rectangle, having a smaller rectangular opening formed therethrough. One or more independent bores can be formed in the heat resistant isolator 915 to accommodate each of the fasteners 180. In the pipe support system 900 depicted in FIG. 9, six bores through the heat resistant isolator 915 are depicted, each bore accommodating one fastener 18a. One or more vibration absorbing materials 920 can be disposed within the smaller rectangular opening, partially or completely filling the opening. The one or more vibration absorbing materials 920 can include, but are not limited to, one or more elastomers, plastics, shredded plastics, fibrous plastics, mixtures thereof, or any combination thereof.

Figure 11:
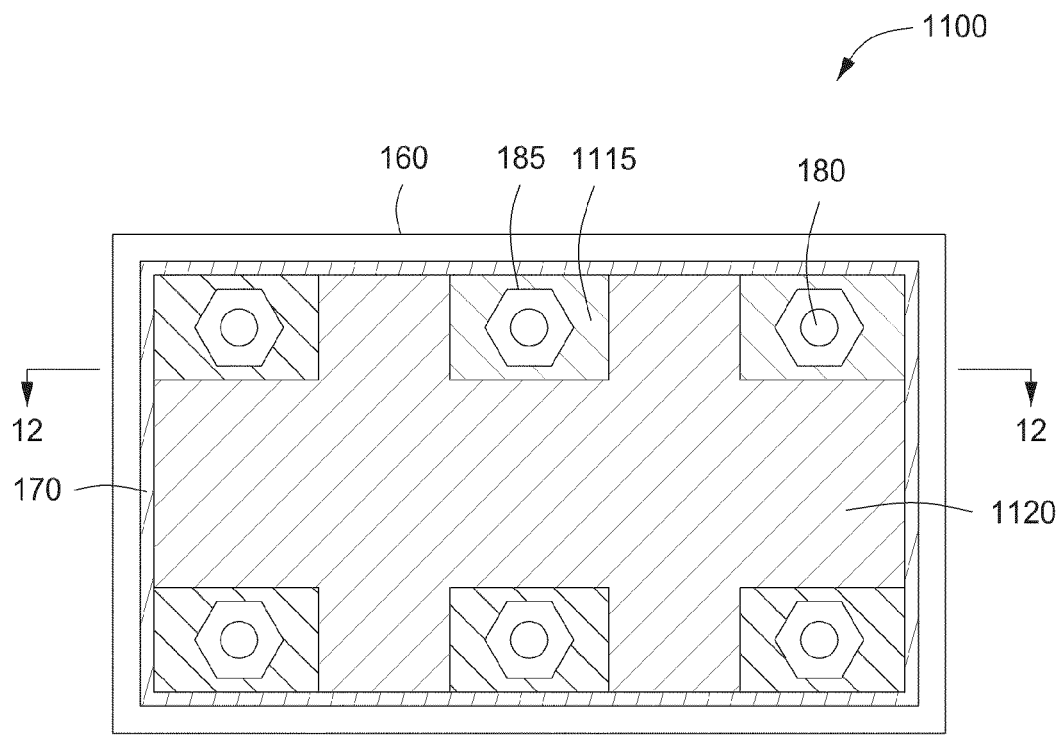
FIG. 11 depicts another horizontal cross-sectional illustration of a pipe support system according to one or more embodiments described.
Figure 12:
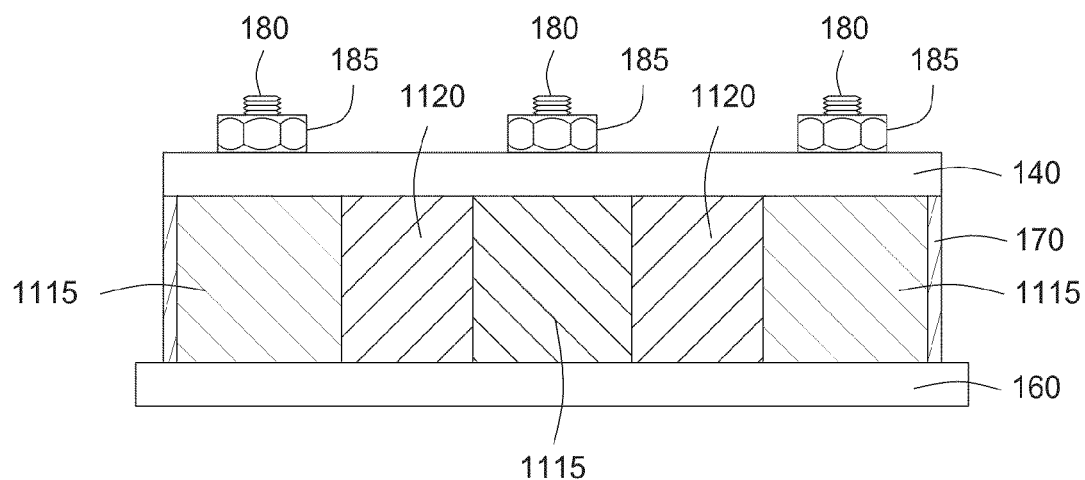
FIG. 12 depicts a vertical cross-sectional illustration of the pipe support system depicted in FIG. 11 along line 12-12, according to one or more embodiments described.

FIG. 11 depicts another horizontal cross-sectional illustration of a pipe support system 1100 according to one or more embodiments. FIG. 12 depicts a vertical cross-sectional illustration of the pipe support system 1100 along line 12-12, according to one or more embodiments. The pipe support system 1100 can include at least two different materials disposed between the movable base 140 and the support base 160. In one or more embodiments, one or more vibration absorbent materials 1120 and one or more individual, independent, heat resistant isolators 1115 can be disposed between the movable base 140 and the support base 160.

The one or more heat resistant isolators 1115 can be made in any solid or hollow geometric shape or configuration, for example rectangular, square, circular, polygonal, or any combination thereof. As depicted in FIG. 11, the one or more individual heat resistant isolators 1115 can be in the shape of a cubic or rectangular solid. In one or more embodiments, each of the one or more individual heat resistant isolators 1115 can a bore formed therethrough for disposal about each of the fasteners 1890 connecting the movable base 140 to the support base 160. The one or more heat resistant isolators 1115 can be fabricated using a material suitable for high compressive loads, for example fiber-reinforced calcium silicate. Fiber-reinforced calcium silicate is commercially available under the trade designations MARINITE, MARINITE P, MARINITE L, etc.

One or more vibration absorbent materials 1120 can be disposed about the individual heat resistant isolators 1115, in the void space formed between the movable base 140, the support base 160 and the individual heat resistant isolators 1115. In one or more embodiments one or more flexible peripheral seals 170 can be disposed about the periphery of the composite isolator formed by the one or more individual heat resistant isolators 1115 and the one or more vibration absorbent materials 1120.

Figure 13:
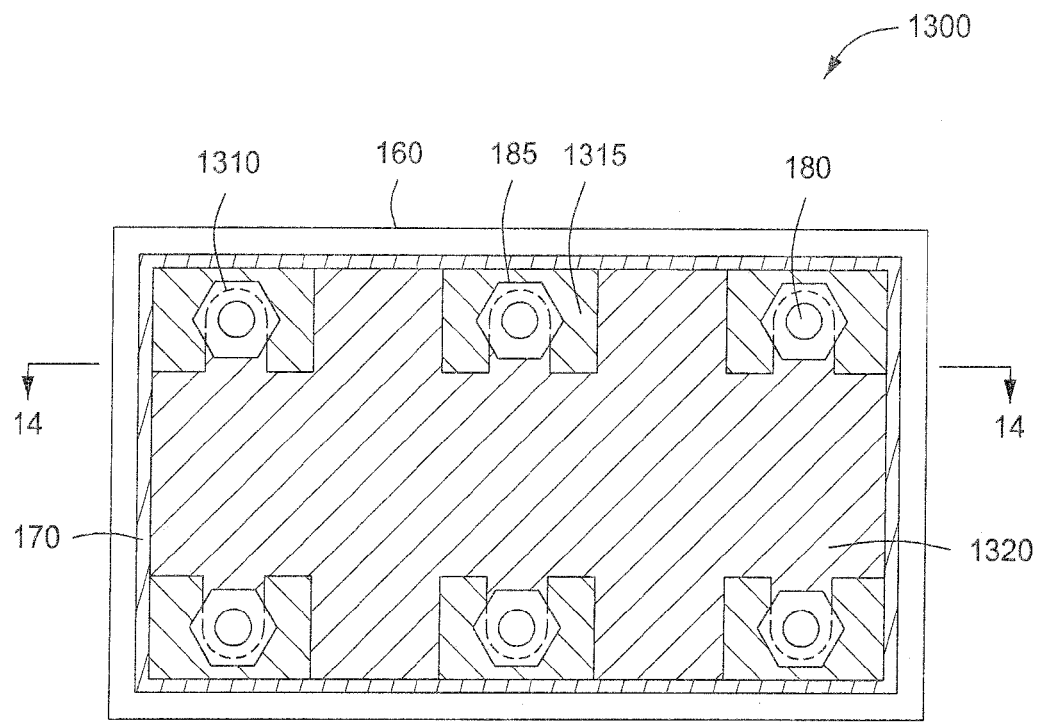
FIG. 13 depicts another horizontal cross-sectional illustration of a pipe support system according to one or more embodiments described.
Figure 14:
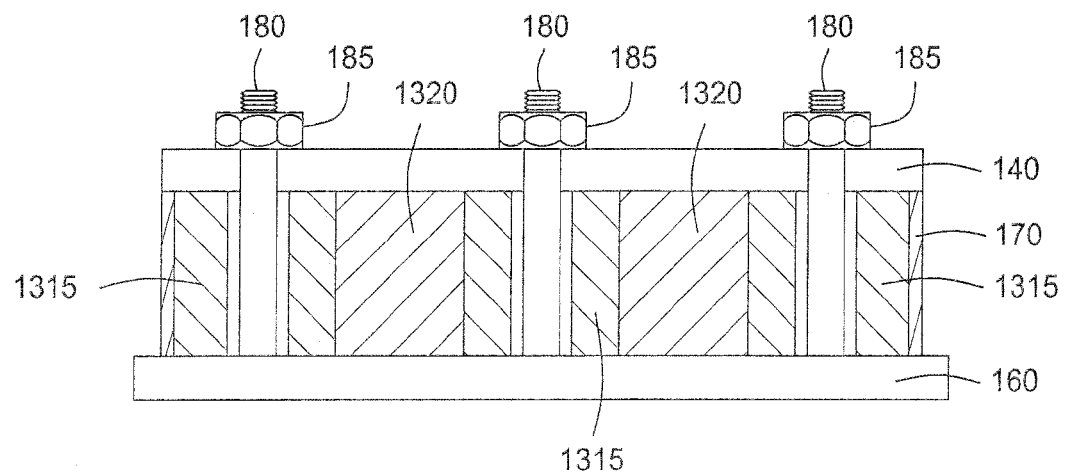
FIG. 14 depicts a vertical cross-sectional illustration of the pipe support system depicted in FIG. 13 along line 14-14, according to one or more embodiments described.

FIG. 13 depicts another horizontal cross-sectional illustration of a pipe support system 1300 according to one or more embodiments. FIG. 14 depicts a vertical cross-sectional illustration of the pipe support system 1300 depicted in FIG. 13 along line 14-14, according to one or more embodiments. Similar to the pipe support system 1100 depicted in FIGS. 11 and 12, the pipe support system 1300 can include two or more heat resistant isolators 1315 and/or vibration absorbent materials 1320 disposed between the movable base 140 and the support base 160. In one or more embodiments, one or more vibration absorbent materials 1320 and one or more individual, independent, heat resistant isolators 1315 can be disposed between the movable base 140 and the support base 160.

The one or more heat resistant isolators 1315 can be in any solid or hollow geometric shape or configuration, for example rectangular, square, circular, polygonal, or any combination thereof. As depicted in FIG. 13, the one or more individual heat resistant isolators 1315 can be formed in the shape of a cubic or rectangular solid having a notch or slot 1310 disposed thereupon. The notch or slot 1310 in each individual heat resistant isolator 1315 can enable the insertion and removal of the heat resistant isolators 1315 without requiring the complete removal of the movable base 140. The ability to remove and replace individual isolators 1135 without removing the movable base 140 can advantageously enable the repair and/or replacement of one or more heat resistant isolators 1315 without disrupting the pipe supported by the pipe support system 1300. The one or more heat resistant isolators 1315 can be fabricated using a material suitable for high compressive loads, for example Fiber-reinforced calcium silicate. Fiber-reinforced calcium silicate is commercially available under the trade designations MARINITE, MARINITE P, MARINITE L, etc.

One or more vibration absorbent materials 1320 can be disposed about the individual heat resistant isolators 1315, between the movable base 140 and the support base 160. In one or more embodiments one or more flexible peripheral seals 170 can be disposed about the periphery of the composite isolator formed by the one or more individual heat resistant isolators 1315 and the one or more vibration absorbent materials 1320.

Figure 15:
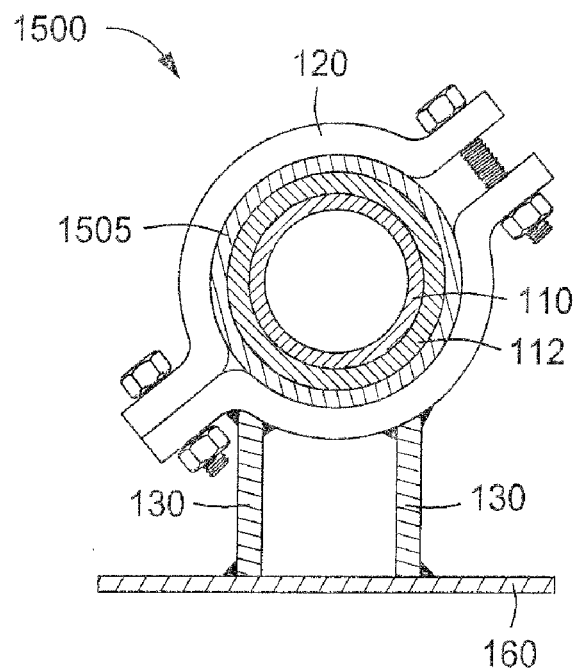
FIG. 15 depicts an end view of an illustrative pipe support system according to one or more embodiments described.

FIG. 15 depicts an end view of an illustrative pipe support system 1500 according to one or more embodiments. In one or more embodiments, the pipe support system 1500 can include one or more isolation materials or barriers ("first isolators") (one is shown 112) and one or more isolation materials or barriers ("second isolators") (one is shown 1505). In one or more embodiments, the first isolator 112, the second isolator 1505, or both can include one or more discrete isolators. For example, the first isolator 112 can include one discrete layer of isolation material and the second isolator can include two discrete layers of isolation material. In one or more embodiments, the first isolator 112 can be at least partially disposed about a pipe 110 to be insulated. In one or more embodiments, the second isolator 1505 can be at least partially disposed about the first isolator 112. In one or more embodiments, the first isolator 112 can be disposed about at least a portion of a length of the outer diameter or outer surface of the pipe 110. In one or more embodiments, the second isolator 1505 can be disposed about at least a portion of a length of the outer diameter or outer surface of the first isolator 112. In one or more embodiments, the pipe support system 1500 can further include one or more clamps (one is shown 120), one or more support members or support bars (two are shown 130), and a support base 160. In one or more embodiments, the pipe 110, the first isolator 112 and the second isolator 1505 can be disposed within the clamp 120. The clamp 120 can be attached to the support base 160 via the one or more support members 130.

In one or more embodiments, the first isolator 112 can be made of any material suitable for thermal and/or acoustic isolation. In one or more embodiments, the first isolator 112 can reduce the transfer of heat and/or acoustic energy from the pipe 110 to the second isolator 1505. In one or more embodiments, the first isolator 112 can reduce the transfer of heat and/or acoustic energy from the second isolator 1505 to the pipe 110. In one or more embodiments, the first isolator 112 can reduce the transfer of heat and/or acoustic energy from the pipe 110 to the second isolator 1505, from the second isolator 1505 to the pipe 110, or both.

In one or more embodiments, the first isolator 112 can insulate the second isolator from a pipe 140 carrying or otherwise transporting a heated fluid, such that the temperature of the second isolator 1505 remains below about 200° C., below about 150° C., below about 125° C., below about 110° C., below about 105° C., below about 100° C., below about 95° C., below about 90° C., below about 85° C., below about 80° C., below about 7503, below about 70° C., or less. For example, a fluid flowing through the pipe 110 at a temperature of about 200° C. can transfer heat to the wall of the pipe 110, which can radiate outwardly toward the first isolator 112. The first isolator 112 can have a heat conductivity low enough, such that sufficient heat flow from the pipe 110 to the second isolator 1505 can be prevented to maintain the second isolator at a temperature of less than about 10° C. In one or more embodiments, the first isolator 112 can have a thermal conductivity less than about 50 mV/m*K, about 40 mW/m*K, about 30 mW/m*K, about 25 mW/m*K, about 20 m mW/*K, about 15 mW/m*K, about 10 mW/m*K, or less.

In one or more embodiments, the first isolator 112 can be stable over a wide range of temperatures. For example, the first isolator 112 can be stable at temperatures ranging from a low of about 250° C., about −200° C., about −175° C., or about −150° C. to a high of about 500° C., about 650° C., about 700° C., about 750° C., or more. In one or more embodiments, the second isolator 1505 can be stable over a wide range of temperatures, however the upper temperature limit of the second isolator 1505 can be exposed to without damage or deterioration can be substantially less than the temperature the first isolator 112 can be exposed. For example, the second isolator 1505 can be stable at a temperature of about 125° C. or less, about 110° C. or less, about 100° C. or less, about 90° C. or less, or about 80° C. or less. In one or more embodiments, the first isolator 112 disposed between the pipe 110 and the second isolator 1505 can provide a pipe support system 1500 suitable for supporting a pipe 110 at a temperature ranging from low (−170° C., for example) to high (400° C., for example), where the second isolator can have an upper operational temperature limit of about 100° C.

In at least one specific embodiment, the pipe 110 can be primarily designed for carrying or transporting fluids at cryogenic temperatures, for example about −165° C. However, due to operational interruptions high temperatures of a fluid within the pipe 110 can be reached. These operational interruptions can cause the fluid within the pipe 110 to increase a temperature of about 100° C. or more, about 125° C. or more, about 150° C. or more, about 175° C. or more, about 200° C. or more, or about 215° C. or more. During these high temperature cycles the first isolator 112 can prevent or otherwise reduce the high temperature radiating from the pipe 110 from damaging or otherwise affecting the material properties of the second isolator 1505. Therefore, the second isolator 1505 can be made from materials suitable for primarily insulating heat transfer from the environment to the normally cryogenic fluid transported within the pipe 110, but during operational interruptions that generate heat within the pipe 110, the second isolator can be protected by the first isolator 112 from damage due to the heat radiating from the pipe 110. This arrangement can provide a second isolator 1505 that can be easier to install, lower cost, more durable to outside environmental parameters, such as water, wind, and/or process fluids than the material of the first isolator 110, provide necessary rigidity, compression strength, and/or provide increased insulation to the pipe 110 that can primarily carry or otherwise transport cryogenic fluids.

In one or more embodiments, the first isolator 110 and/or the second isolator 1505 can insulate the clamp 120, the support members 130, and the support plate 160 from a pipe 110 carrying or otherwise transporting a cryogenic fluid. Conventional steels, for example carbon steel, become brittle at cryogenic temperatures, which can result in fractures and ultimately failure in a pipe support. However, the thermal insulation provided by the first isolator 110 and/or the second isolator 1505 can prevent the clamp 120, support members 130, and the support plate 160 from cooling to temperatures at which conventional steels become brittle.

In one or more embodiments, the first isolator 112 can include, but is not limited to, silica aerogels, woven fibers, non-woven fibers, or any combination thereof. In at least one specific embodiment, the first isolator 112 can be made of a silica aerogel that is reinforced with a non-woven, glass-fiber matting, such as Pyrogel® XT that is available from Aspen Aerogels™. In at least one specific embodiment the first isolator 112 can be made of a silica aerogel that is reinforced with fibers, such as Cryogel Z™ and Spaceloft® that are also available from Aspen Aerogels™. In at least one specific embodiment the first isolator 112 can be a silica aerogel available from Cabot™ and referred to under the trade name Nanogel™. In one or more embodiments, other suitable aerogels can include carbon and/or alumina based aerogels.

In one or more embodiments, the second isolator 1505 can insulate the pipe support system 1500 from thermal energy and/or acoustic energy and/or mechanical energy. The second isolator 1505 can be made of any suitable material for insulating the pipe support system 1500. Illustrative materials suitable for the second isolator 1505 can include, but are not limited to polyurethane and/or high density polyurethane. At temperatures greater than about 100° C., high density polyurethane will begin to be adversely affected. However, the first isolator 1505 can sufficiently insulate the second isolator 1505 from a high temperature (i.e. greater than 100° C.) emitted from the pipe 110. In one or more embodiments, other materials that may be suitable for the second isolator 1505 can include, but are not limited to filled epoxy, laminated wood, glass-fibers, and formed glass, for example.

In one or more embodiments, the first isolator 112, the second isolator 1505, or both can be pre-formed into semi-circular or half-circle forms having a suitable inner diameter. For example, the second isolator 1505 can include two separate half-circle pre-formed sections that, when placed together, provide an inner bore therethrough configured to conform to the outer surface area of the first isolator 112 disposed about the pipe 110.

In one or more embodiments, the first isolator 112 and the second isolator 1505 can be glued together using one or more adhesives. In one or more embodiments, preformed half-circle sections of isolator 1505 can be glued or otherwise secured to the first isolator 112 to provide an integrated first isolator 112 and second isolator 1505. Pre-forming and adhering the first isolator 112 and the second isolator 1505 can reduce installation time and cost. Any suitable adhesive can be used to glue the first isolator 112 to the second isolator 1505. Illustrative adhesives can include, Duro-Tak 80-1068, available from National Starch and Chemical Company or Dap Weldwood 0306, available from DAP International.

Figure 16:
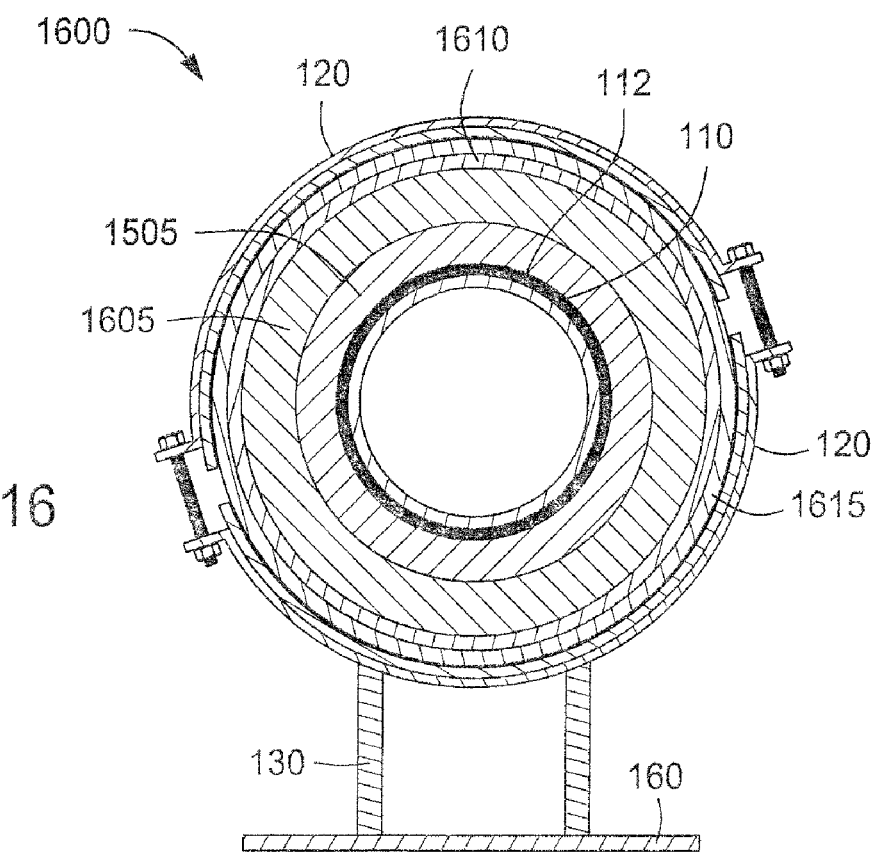
FIG. 16 depicts another end view of an illustrative pipe support system according to one or more embodiments described.

FIG. 16 depicts an end view of an illustrative pipe support system 1600, according to one or more embodiments. In one or more embodiments, the pipe support system 1600 can include a pipe 110, one or more isolation materials or barriers ("first isolators") (one is shown 112), one or more isolation materials or barriers ("second isolators") (one is shown 1505), and one or more isolation materials or barriers ("third isolators") (one is shown 1605). In one or more embodiments, the first isolator 112 can be disposed about at least a portion of the outer diameter or outer surface of the pipe 110. In one or more embodiments, the second isolator 1505 can be disposed about at least a portion of the outer diameter or outer surface of the first isolator 112. In one or more embodiments, the third isolator 1605 can be disposed about at least a portion of the outer diameter or surface of the second isolator 1505. In one or more embodiments, the pipe support system 1600 can further include one or more vapor barriers ("fourth isolators") (one is shown 1610), one or more cladding layers (one is shown 1615), one or more clamps (one is shown 120), support members (two are shown 130), and a support base 160.

In one or more embodiments, the first isolator 112, the second isolator 1505, the clamp 120, support members 130, and support base 160 can be as discussed and described above with reference to FIG. 15. The third isolator 1605 can be made of any suitable material for insulating the pipe support system 1500. In one or more embodiments, the third isolator 1605 can be the same material as the second isolator 1505. In one or more embodiments, the third isolator 1605 can be a different material than the second isolator 1505. Illustrative materials suitable for the third isolator 1605 can include, but are not limited to polyurethane and/or high density polyurethane, filled epoxy, laminated wood, glass-fibers, and formed glass.

In one or more embodiments, the fourth isolator 1610 can be at least partially disposed about the outer diameter or outer surface area of the third isolator 1605. In one or more embodiments, the fourth isolator 1610 can be disposed about the entire outer diameter or surface area of the third isolator 1605. The fourth isolator 1610 can prevent or reduce the transfer of water and/or other fluids from the environment to the second isolator, from the second isolator to the environment, or both. The fourth isolator 1610 can be made from any material suitable for reducing and/or preventing the transfer of one or more fluids. Illustrative materials can include, but are not limited to, polymer films, multilayer films, and the like. In at least one specific embodiment, the fourth isolator 1610 can be Saran 560 Industrial Film available from the Dow Chemical Company. In at least one specific embodiment the fourth isolator 1610 can be an aluminum/polyester/aluminum film, such as Alpha Alaflex Style 13 MAM that is available from Alpha Associates, Inc.

In one or more embodiments, the second isolator 1505, the third isolator 1605, or both can be coated with one or more protective coatings (not shown). The one or more protective coatings can improve various properties of the second isolator 1505 and/or the third isolator 1605, such as mechanical strength. An illustrative material suitable for the one or more protective coatings can include, but are not limited to one or more elastomeric or mastic coatings, such as Monolar Mastic 60-59, which is available from Foster Products.

In one or more embodiments, the first isolator 112 and the second isolator 1505, can be pre-formed as discussed and described above with reference to FIG. 15. In one or more embodiments, the third isolator 1605 and/or the fourth isolator 1610 can also be pre-formed. In one or more embodiments, the first isolator 112, the second isolator 1505, the third isolator 1605, and/or the fourth isolator 1610 can be glued or otherwise secured together.

In one or more embodiments, the cladding layer 1615 can be at least partially disposed about the outer diameter or outer surface area of the fourth isolator 1610. In one or more embodiments, the cladding layer 1615 can be disposed about the entire outer diameter or surface area of the fourth isolator 1610. The cladding layer 1615 can prevent or reduce damage to the pipe 110, the first isolator 112, the second isolator 1505, the third isolator 1605, and/or the fourth isolator 1610 disposed therein. In one or more embodiments, the cladding layer 1615 can prevent and/or reduce damage that can be caused by wind, radiation from the sun, external forces such as a falling tree limb or a dropped tool, and the like.

In one or more embodiments, the cladding layer 1615 can be made from any material suitable for protecting the components (i.e. the pipe 110 and isolators 112, 1506, 1605, and/or 1610) disposed therein. Illustrative materials can include, but are not limited to one or more layers of metal (e.g. stainless steel or aluminum), polymers, fabrics, rubbers, fiber glass, resins, and the like.

Figure 17:
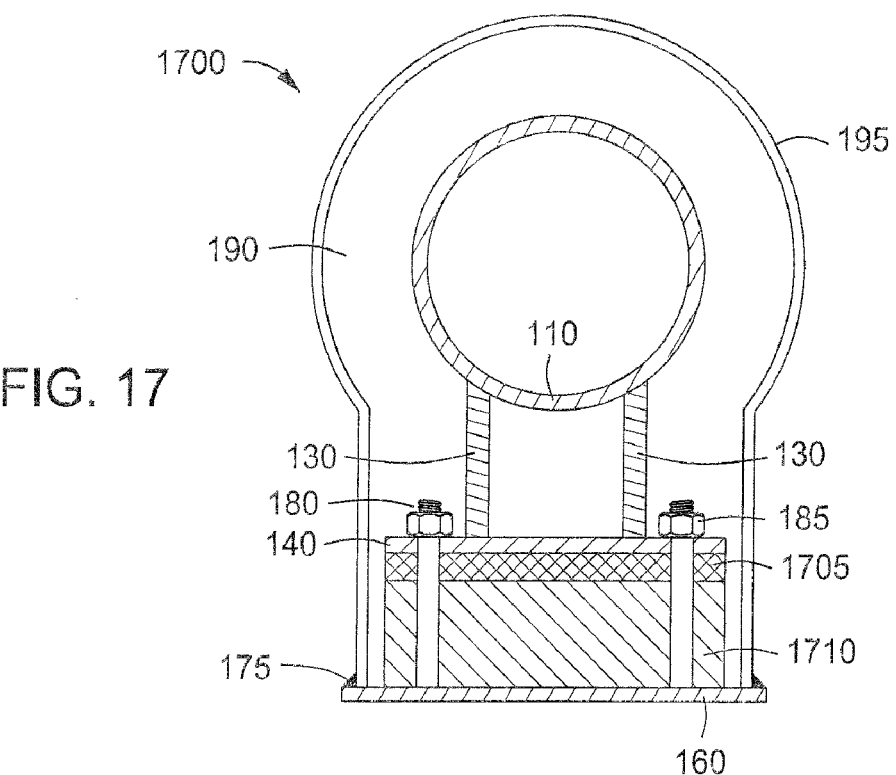
FIG. 17 depicts yet another end view of an illustrative pipe support system according to one or more embodiments described.

FIG. 17 depicts an end view of an illustrative pipe support system 1700 according to one or more embodiments. In one or more embodiments, at least two isolators (two are shown 1705, 1710) can be disposed between a movable base 140 and a support base 160. In one or more embodiments, the isolators 1705, 1710 can reduce or otherwise minimize the transfer of thermal energy (high temperature and/or low temperature) between the underlying support structure and a pipe 110. Such high temperatures, low temperatures, or both can be caused by fluid flow and/or auxiliary equipment to which the pipe 110 is attached. The isolator or "first isolator" 1705 can be fabricated using a material, such as aerogel, that can be subjected to both cryogenic temperatures (e.g. 170° C.) and high temperatures (e.g. 500° C.). The first isolator 1705 can be made from materials similar to the first isolator 112 discussed and described above with reference to FIGS. 15 and 16.

In one or more embodiments, the isolator or "second isolator" 1710 can be fabricated using a material, such as high density polyurethane, that can be subjected to cryogenic temperatures, but not high temperatures (i.e. less than 100° C.). The second isolator 1710 can be made from materials similar to the second isolator 1505 discussed and described above with reference to FIGS. 15 and 16. The first isolator 1705 can minimize heat transfer from the pipe 110 to the second isolator 1710, which can primarily transport cryogenic fluids, but due to operational disruptions can from time to time exceed temperatures greater than 100° C. at which point the second isolator 1710 can be damaged.

In one or more embodiments, the movable base 140 can be attached via one or more support members (two are shown 130) to the pipe 110. In one or more embodiments, the pipe 110 can be attached to the support members 130 by welding, adhesives, clamps, bolts and nuts, or any other equivalent fastening system. In one or more embodiments, the movable base 140 can be attached to the support members 130 by welding, adhesives, clamps, bolts and nuts, or any other equivalent fastening system. In one or more embodiments, the movable base 140 can be attached to the support base 160 via one or more bolts 180 and nuts 185.

In one or more embodiments, insulation 190 and/or a protective layer or covering (one is shown 195) can be disposed about the pipe 110, the support members 130, the movable base 140, the first isolator 1705, and/or the second isolator 1710. In one or more embodiments, the support base 160 can be permanently attached, integral with, or detachably attached to an underlying support structure (not shown).

In one or more embodiments, the insulation 190 can include, but is not limited to, mineral wool, formed glass, glass fibers, and/or filled epoxy. In one or more embodiments, the insulation 190 can substantially cover any portion of any exposed surface of the pipe 110, support members 130, movable base 140, support base 160, or any combination thereof. A protective covering 195 can be included over the thermal insulation 190. The protective covering 195 can be a thin metal sheet, for example, stainless steel or aluminum, fabric, or a coating of mastic. The insulation 190 and/or protective covering 195 can be bolted, glued, and/or band strapped to the pipe 110 and/or pipe support system 1700, if desired.

In one or more embodiments, the protective covering 195 can extend to the support base 160 and include an optional weather seal 175 to seal the protective covering 195 to the upper surface of the support base 160. The weather seal can be as discussed and described above with reference to FIGS. 2 and 3. Thermal insulation 190 and/or protective covering 195 can extend axially along the pipe 110, for example, to a second pipe support system (not shown).

Figure 18:
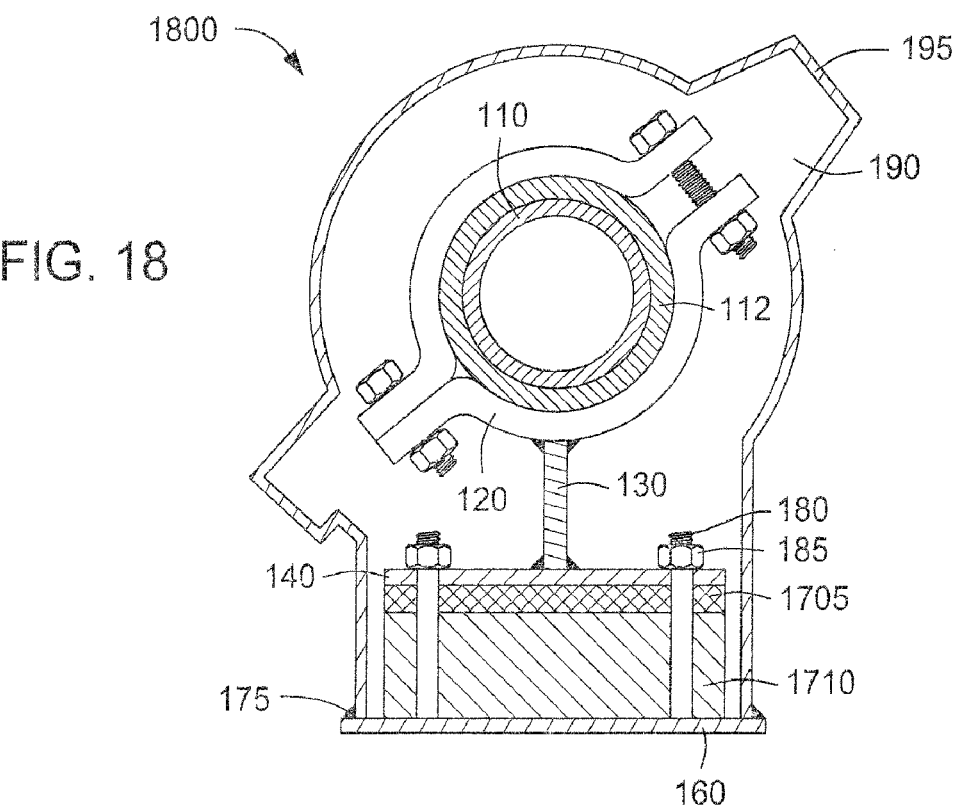
FIG. 18 depicts another end view of an illustrative pipe support system according to one or more embodiments described.

FIG. 18 depicts an end view of an illustrative pipe support system 1800 according to one or more embodiments. In one or more embodiments, at least two isolators (two are shown 1705, 1710) can be disposed between a movable base 140 and a support base 160, which can be as discussed and described above with reference to FIG. 17. In one or more embodiments, the pipe support system 1800 can further include one or more isolation materials or barriers ("first isolators") (one is shown 112), one or more clamps (one is shown 120), and support members (one is shown 130). In one or more embodiments, the first isolator 112 can be at least partially disposed about a pipe 110. The first isolator 112 and the pipe 110 can be supported by the clamp 120, which can be connected to the moveable base 140 via the support members 130 as discussed and described above with reference to FIG. 17. In one or more embodiments, insulation 190 and/or a protective coveting (one is shown 195) can be disposed about the first isolator 112, the clamp 120, the support member 130, the movable base 140, the first isolator 1705, and/or the second isolator 1710. In one or more embodiments, the support base 160 can be permanently attached, integral with, or detachably attached to an underlying support structure (not shown).

Figure 19:
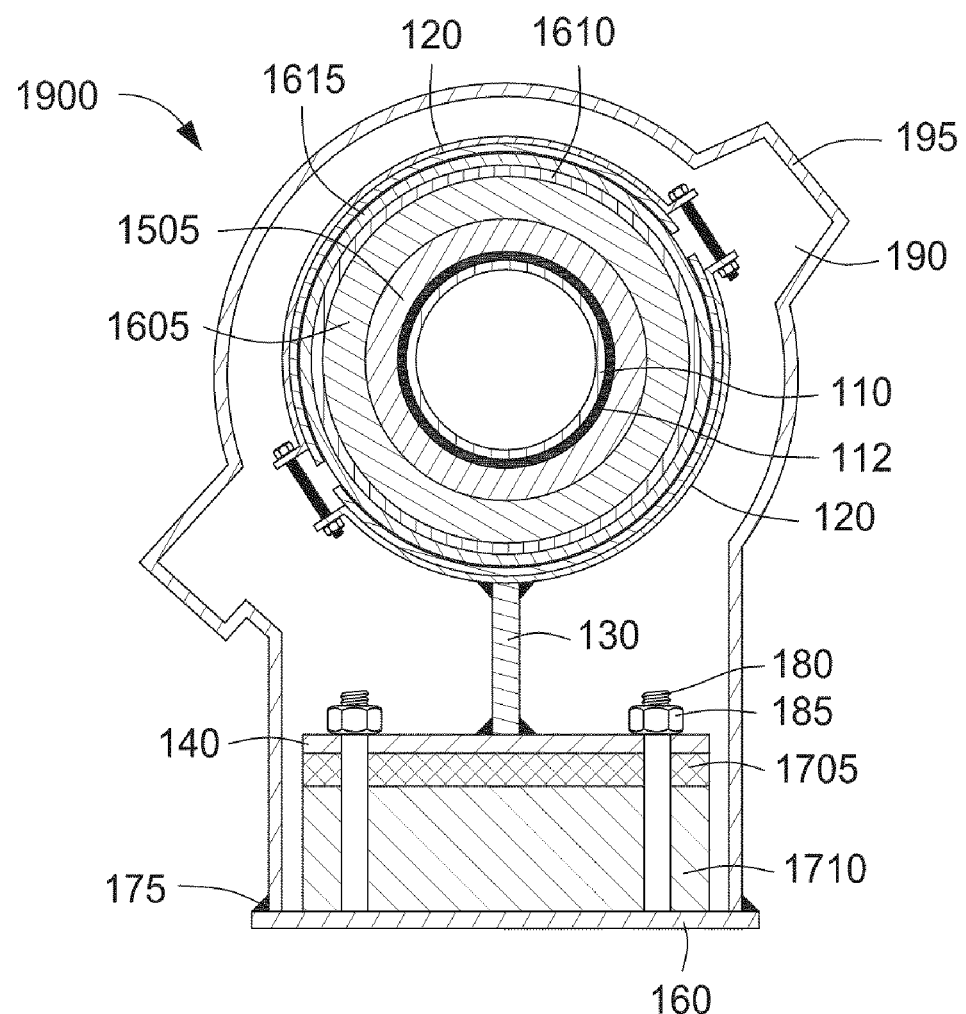
FIG. 19 depicts yet another end view of an illustrative pipe support system according to one or more embodiments described.

FIG. 19 depicts another end view of an illustrative pipe support system 1900 according to one or more embodiments. In one or more embodiments, the pipe support system 1900 can include one or more isolation materials or barriers ("first isolators") (one is shown 112) and one or more isolation materials or barriers ("second isolators") (one is shown 1505). The first isolator 112 and the second isolator 1505 can be as discussed and described above with reference to FIG. 15. In one or more embodiments, the pipe support system 1900 can further include one or mole clamps (one is shown 120), support members (one is shown 130), a movable base 140, at least two isolators 1705, 1710, and a support base 160, which can be as discussed and described above with reference to FIGS. 15-18.

In one or more embodiments, the pipe support system 1900 can thermally and/or acoustically insulate energy from a pipe 110 supported by the pipe support system 1900. The pipe 110 can be at a cryogenic temperature (e.g. 200° C.) or high temperature (e.g. 300° C.). When the pipe 110 radiates heat outwardly at temperatures exceeding 100° C. the second isolators 1505, and 1710 can begin to degrade. However, the thermal insulation provided by the first isolator 112 and the first isolator 1705, as discussed above, can have a heat conductivity low enough, such that sufficient heat flow from the pipe 110 to the second isolator 1505 and the second isolator 1705 can be prevented to maintain the second isolators 1505, 1705 at a temperature of less than about 100° C.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An insulated pipe system comprising:
   a pipe;
   a first isolator disposed about at least a portion of the pipe, wherein the first isolator comprises aerogel; and
   a second isolator disposed about at least a portion of the first isolator;
   a third isolator disposed about at least a portion of the second isolator;
   at least one clamp adapted to support the pipe and the isolators;
   at least one support base; and
   at least one support member, wherein the support member connects the clamp to the support base.

2. The system of claim 1, further comprising a fourth isolator disposed about at least a portion of the third isolator, wherein the fourth isolator comprises one or more layers of polymers, metals, or a combination thereof.

3. The system of claim 2, further comprising a cladding layer disposed about at least a portion of the fourth isolator, wherein the cladding layer comprises a metal or a metal alloy.

4. The system of claim 1, wherein the second isolator, the third isolator, or both are coated with a mastic coating.

5. The system of claim 1, wherein the pipe comprises two or more joints of pipe to form a pipeline.

6. The system of claim 1, wherein the second isolator comprises at least one of high density polyurethane, filled epoxy, and laminated wood.

7. The system of claim 1, wherein the support base is a substantially flat, metallic plate.

8. The system of claim 1, wherein the support base is a metallic plate fabricated from one or more metal alloys selected from the group consisting of ferrous alloys, galvanized ferrous alloys, and non-ferrous alloys.

9. The system of claim 1, further comprising one or more insulation layers disposed about at least one of the clamp, the support member, and the support base.

10. An apparatus for insulating a pipe, comprising:
a support base;
a movable base, wherein the movable base is spatially arranged from the support base;
a fastener at least partially disposed through each of the support base and the movable base;
a first isolator and a second isolator disposed between the support base and the movable base, wherein the first isolator is disposed toward the movable base and the second isolator is disposed toward the support base, and wherein the first isolator comprises aerogel; and
a support member disposed on a first surface of the moveable base at a first end thereof.

11. The apparatus of claim 10, wherein the support member is substantially perpendicular to the first surface of the moveable base.

12. The apparatus of claim 10, wherein a second end of the support member is disposed on a clamp adapted to retain a pipe.

13. The apparatus of claim 10, wherein the second isolator comprises at least one of high density polyurethane, filled epoxy, and laminated wood.

14. The apparatus of claim 12, wherein the pipe comprises two or more joints of pipe to form a pipeline.

15. The apparatus of claim 14, further comprising one or more insulation layers disposed about at least one of the clamp, the support member, the moveable base, the fastener, and the support base.

16. A method for insulating a pipe, comprising:
disposing a first isolator about at least a portion of a pipe, wherein the first isolator comprises aerogel;
disposing a second isolator about at least a portion of the first isolator;
supporting the pipe and the isolators within at least one clamp, wherein the clamp is attached to a support base using at least one support member; and
disposing a third isolator about at least a portion of the second isolator.

17. The method of claim 16, further comprising disposing a fourth isolator about at least a portion of the third isolator; and
disposing one or more layers of insulation about at least a portion of the fourth isolator, the clamp, the support member, the support base, or any combination thereof.

18. The method of claim 16, further comprising coating the second isolator, the third isolator, or both with at least one of a mastic coating and an adhesive.

19. An insulated pipe system comprising:
a pipe;
a first isolator disposed about at least a portion of the pipe, wherein the first isolator comprises aerogel;
a second isolator disposed about at least a portion of the first isolator;
at least one clamp adapted to support the pipe and the isolators, wherein the second isolator is disposed between the at least one clamp and the first isolator;
at least one support base; and
at least one support member, wherein the support member connects the clamp to the support base.

20. The system of claim 19, further comprising a third isolator disposed about at least a portion of the second isolator.

21. The system of claim 20, further comprising a fourth isolator disposed about at least a portion of the third isolator, wherein the fourth isolator comprises one or more layers of polymers, metals, or a combination thereof.

22. The system of claim 21, further comprising a cladding layer disposed about at least a portion of the fourth isolator, wherein the cladding layer comprises a metal or a metal alloy.

23. The system of claim 20, wherein the second isolator, the third isolator, or both are coated with a mastic coating.

24. The system of claim 19, wherein the pipe comprises two or more joints of pipe to form a pipeline.

25. The system of claim 19, wherein the second isolator comprises at least one of high density polyurethane, filled epoxy, and laminated wood.

26. The system of claim 19, wherein the support base is a substantially flat, metallic plate.

27. The system of claim 19, wherein the support base is a metallic plate fabricated from one or more metal alloys selected from the group consisting of ferrous alloys, galvanized ferrous alloys, and non-ferrous alloys.

28. The system of claim 19, further comprising one or more insulation layers disposed about at least one of the clamp, the support member, and the support base.

* * * * *